Patented Dec. 28, 1937

2,103,293

UNITED STATES PATENT OFFICE 2,103,293

CHINTZ

Arnold Leroy Lippert, Wilmington, Del., assignor to Joseph Bancroft & Sons Co., Wilmington, Del., a corporation of Delaware No Drawing. Application April 13, 1937, Serial No. 136,525

4 Claims. (Cl. 91—70)

This invention relates to chintz and it has for its primary object an improved finish for chintz which will retain lustre even after repeated laundering, is spot-proof, appreciably fire-resistant, flexible and foldable. The cloth treated in accordance with my invention has increased strength and may be torn straight across from selvage to selvage.

I have discovered that the resin, urea formaldehyde, in the presence of a protein coagulatable by heat, such as albumen or wheat gluten, and, less desirably, casein, will give such a finish when the resin is set. If the setting is done simultaneously with glazing, as by passing the cloth through a glazer, the finish is highly glossy. If the cloth be passed through a calender using high pressure and heat, the finish is less glossy.

In carrying out the invention, the cloth is subjected to a solution of the resin and the protein, the period of application being sufficient to impregnate the cloth. The solution is preferably prepared by first dissolving the resin in water and then putting the albumen in colloidal suspension or solution in water, and mixing the two. A catalyst, such as an acid salt, for example, ammonium phosphate, is also used. For softening purposes, a softening agent such as ethyl cellulose, is also incorporated. The solution is preferably prepared in the cold. The concentration of the urea formaldehyde may vary, a preferable range being from about 10% to about 30%.

The solution is applied by such means as padder rolls, the lower one of which dips into the solution. Other means of impregnation may be employed.

For a highly glossy finish the impregnated cloth, after drying on a frame, is run through a glazer of usual construction and in which the upper roll is preferably made of steel and is heated to a temperature of from about 320° F. to about 400° F., the middle roll being the usual husk roll and the bottom roll being made of metal. The middle and bottom rolls are not heated and only become warm to the extent that heat is absorbed from the top roll. The top roll operates at a peripheral speed higher than that of the husk roll.

If a less highly glossy finish is desired, the impregnated cloth, after drying on a frame, is run through a calender. The rolls are revolved at essentially the same speed. The cloth is given two nips, and may be run once or several times. The temperature should preferably be at least 400° F. and the pressure should preferably exceed five (5) tons per square inch.

In both cases the resin is set (polymerized) by the heat, and the protein is coagulated by the heat or the formaldehyde or by the action of both. In the case of the glazer, oven treatment should follow to insure setting.

The finish thus imparted is relatively permanent and has the characteristics hereinbefore mentioned. The color of the cloth and the pattern, if any, remain substantially unaffected by the treatment. Apparently the protein affects the physical state of the resin on the polymerization. I think that the protein acts as an agent which either inhibits the growth of the crystals or makes the crystals less sharp. I attribute the increase in strength and the ability to tear straight through from selvage to selvage to this effect of the protein on the crystals.

A composition giving very highly satisfactory results consists approximately of the following: urea formaldehyde 12½ lbs.; albumen 7½ lbs.; ammonium phosphate ¼ lb., ethyl cellulose 1½ lbs.; and water to make 100 lbs.

Natural water soluble resins and other water soluble or emulsifiable synthetic resins—such as phenol formaldehyde and acrylic resin—cannot effectively be used. Some of them are incapable of withstanding the heat and break down, and with others the finish is unsatisfactory because they are water soluble after polymerization or for other reasons. The particular resin, urea formaldehyde, works. It is substantially colorless. Its components are water soluble, and in the polymerized state are insoluble in water and unattacked by boiling soap solution, the resin being thermoplastic before setting.

The invention is applicable to products other than chintz which are mechanically lustrous.

This invention is a continuation in part of my application Serial No. 105,083, filed October 10, 1936.

I claim:

1. The process of making chintz which comprises impregnating the cloth with a water solution of urea formaldehyde and a coagulatable protein, the solution having a concentration of about 10% to about 30% of urea formaldehyde, and passing the treated cloth through a heated glazer to simultaneously set the resin and glaze the cloth.

2. The process of making chintz which comprises impregnating the cloth with a water solution of urea formaldehyde and a coagulatable protein and subjecting the cloth to sufficient heat and pressure to simultaneously set the resin and glaze the cloth, the solution having a concentration of about 10% to about 30% of urea formaldehyde.

3. The process of making chintz which comprises impregnating the cloth with a solution of urea formaldehyde and a protein coagulatable by heat, the urea formaldehyde being present in a substantial concentration but not in excess of 30% and passing the cloth through a calender heated to at least approximately 400° F. and operating at a pressure upwards of about 5 tons per square inch to simultaneously set the resin and glaze the cloth.

4. A solution for imparting a chintz finish to cloth, comprising water, and the following ingredients in the respective proportions indicated: urea formaldehyde 12½ lbs., albumen 7½ lbs., ammonium phosphate ¼ lb., and ethyl cellulose 1½ lbs.

ARNOLD L. LIPPERT.